F. F. SEELAND.
Apparatus for Opening and Loosening Wool and other Fibers.
No. 233,288.  Patented Oct. 12, 1880.
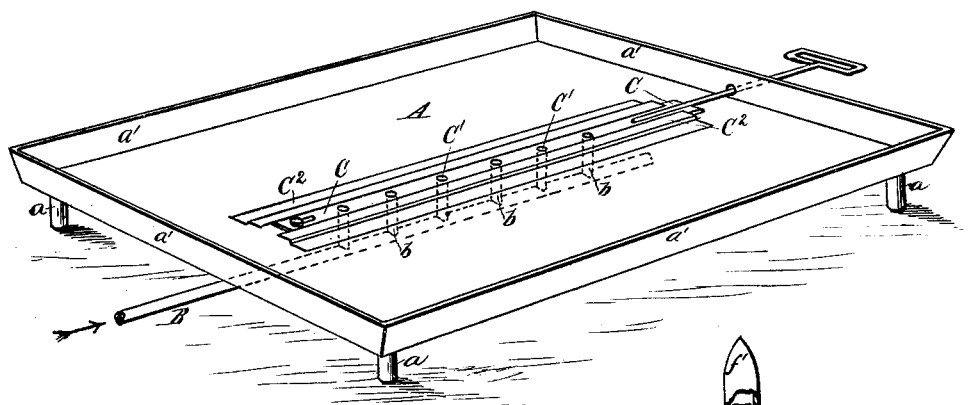
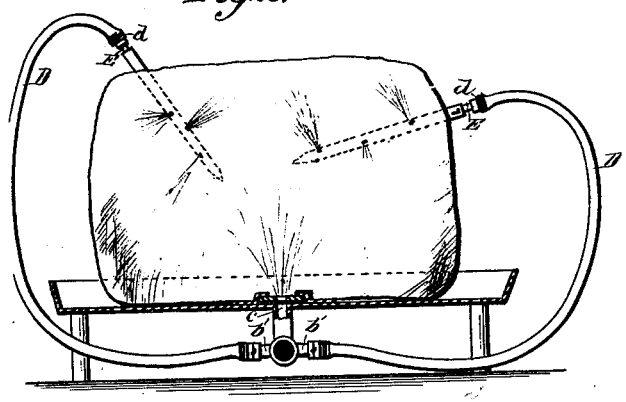
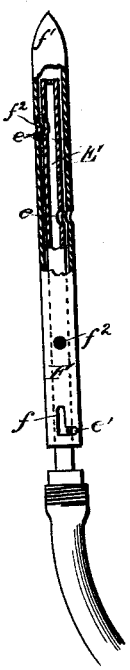
WITNESSES
INVENTOR
Frederick F. Seeland
by F. S. Stetson,
ATTORNEY

UNITED STATES PATENT OFFICE.

FREDERICK F. SEELAND, OF NEW YORK, N. Y., ASSIGNOR TO HIMSELF AND JOHN GREIVES, OF PATERSON, N. J.

APPARATUS FOR OPENING AND LOOSENING WOOL AND OTHER FIBERS.

SPECIFICATION forming part of Letters Patent No. 233,288, dated October 12, 1880.

Application filed January 12, 1880.

*To all whom it may concern:*

Be it known that I, FREDERICK F. SEELAND, of New York city, in the State of New York, have invented certain new and useful Improvements in Apparatus for Opening and Loosening Fibrous Material; and I do hereby declare that the following is a full and exact description thereof.

I can use the apparatus to treat hair, cotton, and various other fibers, including flax and hemp; but I have designed it more particularly for treating wool. It acts by the penetrating and swelling effect of steam. The unbaled or liberated fiber is penetrated by steam and swelled very greatly and opened, so as to greatly facilitate the subsequent operations.

One result of the treatment with steam is to so swell and open the wool that each separate fleece may be easily detached from the adjacent fleeces, thus enabling different wools to be graded prior to their ordinary combing and other modes of separation.

It has long been a desideratum to take the fleeces of different grades and quality from the bale after the bands have been ruptured separately—*i. e.*, the lambs' fleece separate from the adjacent fleece of the old sheep—that of one grade of quality or degree of market value from its adjacent fleece of different grade or value. To accomplish this my invention is designed.

The following specifies what I consider the best means of carrying out my invention: I provide a table or platform supported at a proper height on legs or equivalent supports. One or more steam-pipes lead from a boiler or other steam-generator, and, extending beneath and adjacent to the table, it, or each, is provided with branch pipes, which extend upward through the table, to which they are soldered or otherwise secured. The open tops of these branches or vertical pipes are governed by a single valve-plate having perforations to correspond with the steam-ports in the series in such number and positions that a single movement of the valve-plate in either direction will open or close the entire series.

The outer edge of the table, which is pref- erably of rectangular form, is formed into an upward flange, or such flanges may be secured thereto.

The valve-plate is provided with a proper operating-handle, and works in metal guides, occupying but little vertical space, so as to elevate the bale which rests thereon but slightly, if any, from the surface of the table.

The bale being placed upon the table, the slide is pulled, and the steam through the series of steam-exits is forced by its pressure into the bale and permeates the several fleeces.

To have the steam more fully and completely reach every portion of the bale, I provide flexible tubes or hose, which are connected to the steam-pipes below, and into which steam is allowed to enter, controlled by a steam-cock, and which are connected to the steam-pipe below. There may be any desired number of these tubes. Each is provided, at its free end, with a metal tube perforated to form several steam-exits, and having a pin, as shown, to operate in a bayonet-slot or other suitable opening which will admit of longitudinal or rotary play in an outer tube, which in its turn is perforated to exactly coincide with the perforations in the tube secured upon the end of the pipe or hose when the inner tube is pulled out as far as the pin in the slot will permit. When these tubes are in the act of being inserted into the bale, or of being removed therefrom, the inner tube is pushed into the outer tube as far as it will go. In this position the holes in the inner and outer tubes do not correspond. The two perforated tubes form, so to say, one solid closed tube, which prevents dust, hair, wool, or dirt from falling into the tubes and closing the holes. When the tubes are fully inserted into the bale enough steam is turned on to have some pressure in the tubes. Then the inner tube is pulled out of the outer one so far as the pin in the slot will permit, or turned so as to cause the holes to coincide and to allow the steam to issue freely and permeate the mass of fibrous material. These outer tubes have sharp-pointed closed ends, and are adapted to be easily forced into the bale at desired places at will. When it is necessary to remove the same the flexible connection is rotated or pushed in, so as to close the holes, the steam is shut off, and the tubes are removed.

Referring to the drawings, Figure 1 is a perspective view; Fig. 2, an end elevation, partly in section, and Fig. 3 a detail.

A represents the table, supported on legs $a$ $a$, and having flanges $a'$ $a'$, as shown.

B represents the steam-pipe having vertical branches $b$ $b$ $b$, the upper ends of which pass through holes in the table and are rigidly secured thereto. The steam-exits $c$ $c$ $c$ thus formed in a series are governed by a single valve-plate, C, having apertures $C'$ $C'$, to correspond with the said steam-exits $c$ $c$ $c$. This valve-plate C moves in guides $C^2$ $C^2$, as shown.

D represents flexible tubes connecting with the steam-pipe B at $b'$ $b'$, and having each a proper steam-connection, $d$, with a tube, E, perforated at $ee$, and provided with a pin or lug, $e'$, as shown. This pin $e'$ operates in a bayonet-slot, $f$, in a tube, F, having pointed end $f'$, and perforated at $f^2$ to correspond in number and position with the perforations $e$ in the tube E.

From the foregoing description and illustration the operation of the entire device is obvious.

Various modifications may be made without departing entirely from the principle or sacrificing all of the advantages of the invention. For instance, several pipes, branches, and steam-exits may be used in connection with the table. The steam-exits under the bale may be irregularly scattered over the surface and not in a straight series. I can have a number of cocks controlling the access of steam to different parts of the platform A, so that when only a small bale is treated no steam shall be discharged outside. Parts of the apparatus may be used without the rest; but I prefer the whole used together, as shown. The perforated tube F may be connected directly to the flexible tube D, and a proper controlling-cock be supplied.

What I claim is—

1. The combination of the steam-pipe B, having branches $b$ $b$, with a platform, A, having steam-exits $c$ $c$, and with the valve C C and guides $C^2$, as and for the purposes specified.

2. The interior tube, E $e$ $e$, and pointed exterior tube, F $f$ $f'$ $f^2$, combined with flexible tube D and steam-connections, as and for the purposes herein specified.

In testimony whereof I have hereunto set my hand this 6th day of January, 1880, in the presence of two subscribing witnesses.

FRED. F. SEELAND.

Witnesses:
THOMAS D. STETSON,
CHARLES C. STETSON.